US010846341B2

(12) United States Patent
Cerino et al.

(10) Patent No.: US 10,846,341 B2
(45) Date of Patent: Nov. 24, 2020

(54) SYSTEM AND METHOD FOR ANALYSIS OF STRUCTURED AND UNSTRUCTURED DATA

(71) Applicant: KPMG LLP, New York, NY (US)

(72) Inventors: Timothy J. Cerino, Hastings on Hudson, NY (US); Justin Mathew Edwards, Chicago, IL (US); James Johnson Gardner, Huntington Beach, CA (US); John Hyung Lee, Irvine, CA (US); Gabriel C. Stoenescu, Aurora, CO (US)

(73) Assignee: KPMG LLP, New York, NY (US)

( * ) Notice: Subject to any disclaimer, the term of this patent is extended or adjusted under 35 U.S.C. 154(b) by 169 days.

(21) Appl. No.: 16/159,088

(22) Filed: Oct. 12, 2018

(65) Prior Publication Data

US 2019/0114370 A1 Apr. 18, 2019

Related U.S. Application Data

(60) Provisional application No. 62/572,266, filed on Oct. 13, 2017.

(51) Int. Cl.
*G06F 16/9032* (2019.01)
*G06F 40/14* (2020.01)
*G06F 40/30* (2020.01)
*G06F 40/56* (2020.01)
*G06F 40/131* (2020.01)
*G06F 40/169* (2020.01)
*G06F 40/205* (2020.01)
(Continued)

(52) U.S. Cl.
CPC ...... *G06F 16/90332* (2019.01); *G06F 16/116* (2019.01); *G06F 16/1794* (2019.01); *G06F 16/285* (2019.01); *G06F 16/35* (2019.01);

*G06F 40/131* (2020.01); *G06F 40/14* (2020.01); *G06F 40/169* (2020.01); *G06F 40/205* (2020.01); *G06F 40/216* (2020.01); *G06F 40/295* (2020.01); *G06F 40/30* (2020.01); *G06F 40/56* (2020.01); *G06K 9/00456* (2013.01); *G06N 20/00* (2019.01)

(58) Field of Classification Search
CPC ............... G06F 40/30; G06F 16/1794; G06F 16/90332; G06F 40/169; G06F 40/56
USPC ...................................... 707/769, 722, 736
See application file for complete search history.

(56) References Cited

U.S. PATENT DOCUMENTS 7,139,752 B2    11/2006  Broder et al.
9,053,086 B2     6/2015  Dubbels
(Continued)

FOREIGN PATENT DOCUMENTS

WO    WO 2009/087431    7/2009

OTHER PUBLICATIONS

Apache UIMA, https://uima.apache.org/, pp. 1-5, Jul. 26, 2017.
(Continued)

*Primary Examiner* — Hung T Vy
(74) *Attorney, Agent, or Firm* — Hunton Andrews Kurth LLP

(57) ABSTRACT

The invention relates to computer-implemented systems and methods for analyzing and standardizing various types of input data such as structured data, semi-structured data, unstructured data, and images and voice. Embodiments of the systems and the methods further provide for generating responses to specific questions based on the standardized input data.

20 Claims, 13 Drawing Sheets

(51) Int. Cl.
*G06F 40/216* (2020.01)
*G06F 40/295* (2020.01)
*G06N 20/00* (2019.01)
*G06F 16/178* (2019.01)
*G06F 16/11* (2019.01)
*G06F 16/28* (2019.01)
*G06F 16/35* (2019.01)
*G06K 9/00* (2006.01)

(56) References Cited

U.S. PATENT DOCUMENTS

| | | | |
|---|---|---|---|
| 9,519,706 B2 | 12/2016 | Luke | |
| 9,984,428 B2* | 5/2018 | Doyle | G06Q 10/10 |
| 10,628,471 B2* | 4/2020 | Chandramouli | G06F 40/30 |
| 2002/0143797 A1 | 10/2002 | Zhang et al. | |
| 2005/0289182 A1 | 12/2005 | Pandian et al. | |
| 2012/0011428 A1 | 1/2012 | Chisholm | |
| 2014/0067792 A1 | 3/2014 | Erdogan et al. | |
| 2014/0156833 A1 | 6/2014 | Robinson | |
| 2014/0297356 A1 | 10/2014 | Jayade | |
| 2015/0277900 A1 | 10/2015 | O'Keeffe et al. | |
| 2016/0179934 A1* | 6/2016 | Stubley | G06F 16/3329 707/722 |
| 2016/0180437 A1* | 6/2016 | Boston | G06F 40/30 705/26.7 |
| 2017/0012988 A1 | 1/2017 | Turgeman et al. | |
| 2017/0069043 A1 | 3/2017 | Doyle et al. | |
| 2018/0025075 A1* | 1/2018 | Beller | G06F 40/284 707/769 |
| 2018/0137419 A1* | 5/2018 | Byron | G06F 40/30 |

OTHER PUBLICATIONS

Apache UIMA Ruta™, https://web.archive.org/web/20170721192241/ https://uima.apache.org/ruta.html, pp. 1-3, (Wayback Machine dated Jul. 21, 2017; printed Nov. 4, 2019).

Industrial-Strength Natural Language Processing in Python, https://spacy.io/, pp. 1-4, Jul. 26, 2017.

Operationalize enterprise information into actionable intelligence, https://www.smartlogic.com, pp. 1-5, Jul. 26, 2017.

Watson Knowledge Studio documentation—Watson Developer Cloud, Creating a rule-based annotator, https://web.archive.org/web/20161219064856/http://www.ibm.com/watson/developercloud/doc/wks/wks_rule_annotator_ovw.shtml, pp. 1-15, (Wayback Machine dated Dec. 19, 2016; printed Nov. 4, 2019) (also includes 17-page addendum with text from Wayback Machine page).

International Search Report and Written Opinion issued in corresponding Application No. PCT/US18/55892, dated Dec. 26, 2018.

International Search Report and Written Opinion issued in corresponding Application No. PCT/US18/55921, dated Dec. 31, 2018.

* cited by examiner

FIG. 3

Lume name (string, required): *A string representing the name of this lume*
lume_id (uuid, optional): *An unique identifier of UUID type. If not provided it will be set to a Type 4 UUID*
data (obj, optional): *An arbitrary data object - expected to be JSON-serializable.*
elements (iterable, optional): *An iterable of Lume Element objects*

Lume Element
element_type (string, required): *A string representing the type of this lume element*
element_id (uuid, optional): *An unique identifier of UUID type. If not provided it will be set to a Type 4 UUID*
attributes (iterable, optional): *A key-value data structure of arbitrary primitive types*

Lume Element

Lume Element

Lume Element

Lume Element

Protocol Number: ZZ4023452
Date: 19-Sep-2013
Revised Date: 30-Apr-2015

Observational Study Protocol ZZ4023452

RENAL CELL CANCER MOLECULAR PROFILING AND CLINICAL OUTCOMES IN U.S. COMMUNITY ONCOLOGY PRACTICES

Revised Protocol Number: 01
Incorporates Amendment 02

Study Director
Tammy Stevens, PhD, MPH.
Telephone (office): 634-837-1026                *Lume Element* 411

Protocol Manager
Mike Dolan
Telephone (office): 634-227-5552                *Lume Element* 412

CRO
Martha Jean
2012 Terming, 30th Floor, North Attleboro, MA
02139 Telephone (office): 333-567-2351          *Lume Element 413*

Xenon, Young and Zenith R&D
234 Old West Highway
Youngstown, OH 23402                            *Lume Element 414*

This document is the confidential and proprietary information of Xenon, Young and Zenith Company and its global affiliates (XYZ). By reviewing this document, you agree to keep it confidential and to use and disclose it solely for the purpose of assessing whether your organization will participate in and/or the performance of the proposed XYZ-sponsored study. Any permitted disclosures will be made only on a confidential "need to know" basis within your organization or to your independent ethics committee(s). Any other use, copying, disclosure or dissemination of this information is strictly prohibited unless expressly authorized in writing by XYZ. Any supplemental information (e.g., amendments) that may be added to this document is also confidential and proprietary to XYZ and must be kept in confidence in the same manner as the contents of this document. Any person who receives this document without due authorization from XYZ is requested to return it to XYZ or promptly destroy it. All other rights reserved.

*Lume Element 415*

Approved 7.1.0   03007357 4.0

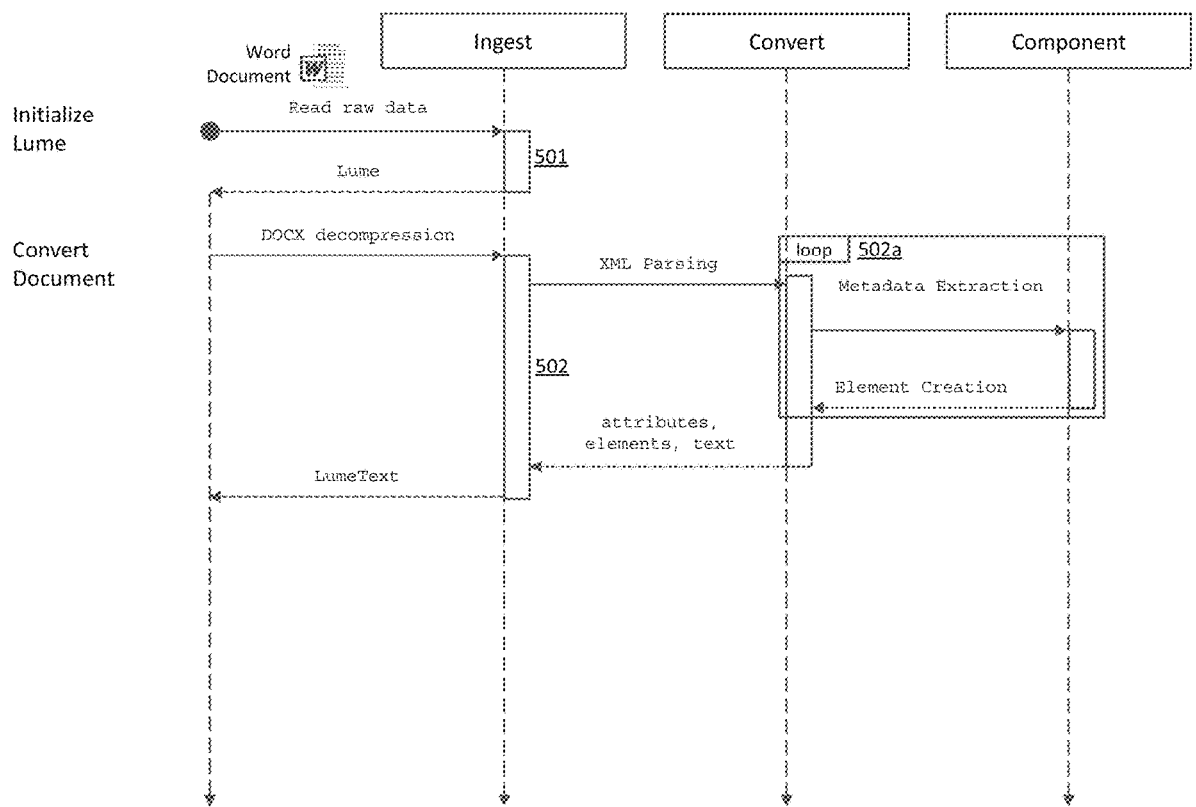

FIG. 8

MG 1     Client's organization is subject     Notification requirement 3.8.10   The Investment Manager shall promptly inform the Client in writing of:

(i)     any material sanctions, fines, licensing conditions, license revocations or investigations of which the Investment Manager is aware and not prohibited by law from disclosure, initiated against or imposed on the Investment Manager or any of its employees, or any Permitted Delegate, by a Governmental Agency or regulatory authorities subsequent to the date of this Agreement during the effectiveness of this Agreement;

(ii)     any transaction resulting in a change of at least 50% of the ownership interests in the Investment Manager, or any Permitted Delegate, or, if the Investment Manager is controlled by another entity, in the entity controlling the Investment Manager;

(iii)     any change in the individual portfolio manager or portfolio managers of any or all of the Portfolios; and Personnel changes

MG 212

(f)     To the fullest extent permitted by law, the Manager covenants and agrees that it shall notify the Client within three (3) business days of the departure or reassignment of senior personnel with direct responsibility or oversight in respect to the Account as identified in Exhibit D.

FIG. 9

| Name | Condition | Expression | Scope |
|---|---|---|---|
| Termination_Term_Date | | %ANNOTATE[<termination_date>] %FILTER[<DATE>] ((%TERMINATION_LANGUAGE %AND %CONTRACT_DATE_LANGUAGE) %IN <SENTENCE>) | %TERMINATION_CLAUSE |
| Finds sentences that have both the termination language, and the contract date. In those sentences, the dates are extracted, and those dates are written back into the Lume as Lume Elements of type termination_date. | | | |
| Notification_Language | | "notify" %OR "notice" %OR "notified" %OR "inform" %OR "informing" %OR "informed" | |
| This expression is used to capture language related to notification and the result is returned into the value of the variable $Notification_Language | | | |
| Key_Personnel | | "key person" "investment team" "professional staff" "senior staff" "senior officers" "portfolio manager" "portfolio managers" "investment managers" "key decision makers" "key employees" | |
| This expression is used to capture language related to key personnel and the result is returned into the value of the variable $Key_Personnel | | | |
| Key_Personnel_Notification_Sentence | | <SENTENCE> %CONTAINING ($Key_Personnel %AND $Notification_Language) | %NOTIFICATION_CLAUSE |
| This expression searches for notification clauses section in the document that contain both the key personnel, and the notification language. The sentence that contains this clause is returned into the variable $Key_Personnel_Notification_Sentence | | | |
| Key_Personnel_Notification_Determination | | %ANNOTATE[<key_person_notification>] %ML_KEYPERSON_MODEL ($Key_Personnel_Notification_Sentence) | |
| This model will run a Machine Learning classifier on the sentences identified in the $Key_Personnel_Notification_Sentence. The resulting determination and score are stored as annotations as Lume Elements of type key_person_notification. | | | |
| Key_Person_Identified | $Key_Personnel_Notificatio n_Determination | %WRITE[<key_person_identified value=True>] | |
| If the $Key_Personnel_Notification_Determination is true, then the Lume Element with type key_person_identified, and attributes "value", True will be written into the Lume | | | |

Syntax:
%[OPERATOR]
$[VARIABLE]
<LUME ELEMENT>
"STRING"

FIG. 10

| Filename | Termination_Term_Date | Key_Person_Notification_Determination (value) | Key_Person_Notification_Determination (Confidence Score) | Key_Person_Identified |
|---|---|---|---|---|
| Contract1_AcmeCo.pdf | 12/31/2020 | 30 days | .95 | True |
| Contract2_AcmeCo.pdf | 3/31/2018 | 60 days | .81 | True |
| Contract1_AcmeIntl.pdf | 9/30/2022 | 90 days | .40 | False |
| Contract1_CA.pdf | 7/31/2021 | 60 days | .92 | True |
| Contract1_Util.pdf | 4/15/2019 | 2 weeks | .88 | True |
| Contract1_Anytown.pdf | 4/1/2020 | 30 days | .92 | True |

FIG. 11

MG 164
(...)
obligations under this agreement or applicable law, which belief is based upon and supported by tangible evidence of such failure to comply or perform.

14. Assignment. In accordance with Sections 205(a)(2) and 205(a)(3) of the Investment Advisers Act of 1940, you may not assign this agreement without our prior written consent. Any unpermitted assignment shall effect an immediate termination of this agreement. You shall promptly notify us in writing of any significant change in your management, including any significant change in your professional staff directly responsible for your activities under this agreement or any material change in the ownership or organization of your firm. Notwithstanding the above. Client will be notified by the Manager of a change in general partners of the Manager within a reasonable time thereafter. We may assign this agreement to any trust that holds assets of any Plan without your consent upon written notice. A change in the identity of the Investment Office shall not constitute an assignment of this agreement.

15. Notices. Any written notice required by or pertaining to this agreement shall be personally delivered, or sent by prepaid first class mail or by fax as follows:
(...)

SYSTEM AND METHOD FOR ANALYSIS OF STRUCTURED AND UNSTRUCTURED DATA

CROSS-REFERENCE TO RELATED APPLICATION

This application claims the benefit of the filing date of, and incorporates by reference thereto in its entirety, U.S. Provisional Patent Application Ser. No. 62/572,266, filed on Oct. 13, 2017.

FIELD OF THE INVENTION

The present invention relates to systems and methods for analyzing and standardizing various types of input data, and generating responses to specific questions based on the standardized input data.

BACKGROUND

The digitization of labor continues to progress as advancements in machine learning, natural language processing, data analytics, mobile computing and cloud computing are used in various combinations to replace certain processes and functions. Basic process automation can be implemented without significant IT investment as solutions may be designed, tested and implemented for a relatively low cost. Enhanced process automation incorporates more advanced technologies that enable the use of data to support elements of machine learning. Machine learning tools can be used to discover naturally-occurring patterns in data and to predict outcomes. And natural language processing tools are used to analyze text in context and extract desired information.

However, such digital tools are generally found in a variety of formats and coding languages and, therefore, are difficult to integrate and are also not often customized. As a result, such systems would not be able to provide automated solutions or answers to specific questions requiring analysis and processing of various types of input data e.g., structured data, semi-structured data, unstructured data, and images and voice. For example, such systems are currently unable to efficiently address questions such as "[w]hich of these 500 contracts fails to comply with new banking regulation XYZ?".

It would be desirable, therefore, to have a system and method that could overcome the foregoing disadvantages of known systems and that could apply automated and customized analysis to analyze documents, communications, text files, websites, and other structured and unstructured input files to generate output in the form of answers to specific questions and other supporting information.

SUMMARY

According to one embodiment, the invention relates to a computer-implemented system and method for analysis of structured and unstructured data to provide answers to a specific question. The method may comprise the steps of receiving at least one specific question and at least one input file to be analyzed comprising text, image, audio, video, a table, and/or a database or a mix thereof; generating a converted file in a standardized format that includes a name of the file or document, a file type of the file or document, a string or binary representation of the file or document, and at least one element; generating at least one element in a stand-off annotation format, wherein generating the element requires only an element identifier and an element type, and the element is not stored in a hierarchical relationship format to other elements; generating at least one expression to be applied to the converted file, wherein the expression comprises an expression string that incorporates subject matter expertise for a particular question and is in a format that is not a computer programming language; and applying the expression(s) to the annotated file to generate an output file that provides an answer to a specific question based on the subject matter expertise.

The invention also relates to computer-implemented system for analysis of structured and unstructured data to provide answers to specific questions, and to a computer-readable medium containing program instructions for executing a method for analysis of structured and unstructured data.

The system may provide value in a number of ways including: (a) providing 100% coverage vs. traditional sampling approaches; (b) reducing costs and development time needed to produce insights; (c) enabling humans to achieve and manage precise consistency; (d) leveraging the knowledge and experience of subject matter experts; and (e) automatically creating audit logs describing how data has been processed.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 3 is a representation of a standard data format for a converted file, referred to herein as Lume, according to an exemplary embodiment of the invention.

FIG. 4B illustrates a larger view of the document with metadata depicted in FIG. 4A.

FIG. 5 is a drawing depicting a Lume creation process from a Microsoft Word document according to an exemplary embodiment of the invention.

FIG. 8 illustrates an example of a document to be ingested and analyzed by the analysis system according to an exemplary embodiment of the invention.

FIG. 9 is an example of expression, presented as expression strings shown in a table according to an exemplary embodiment of the invention.

FIG. 10 is an example of output from an intelligent domain engine in the form of predicted answers according to an exemplary embodiment of the invention.

FIG. 11 is an example of output from an intelligent domain engine in the form of support and justification for answers according to an exemplary embodiment of the invention.

DETAILED DESCRIPTION

Figure 1:
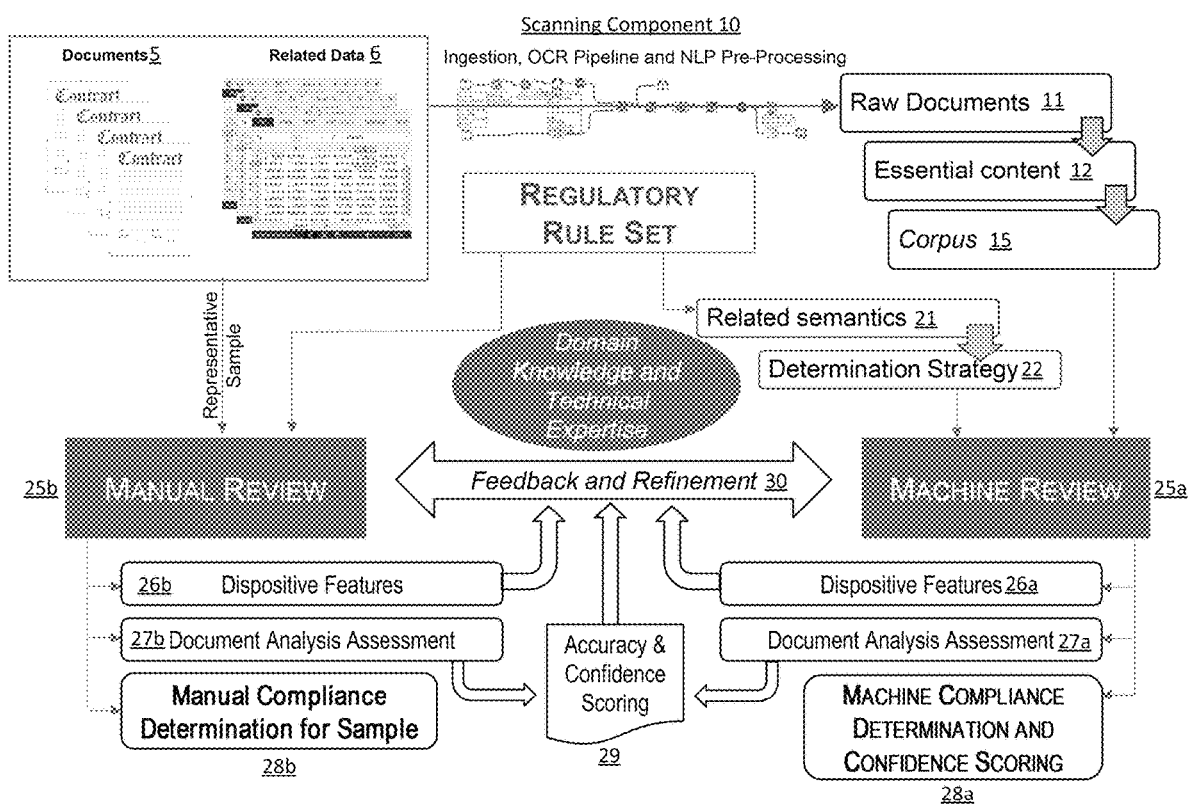
FIG. 1 is a functional block diagram for an analysis system according to an exemplary embodiment of the invention.

Exemplary embodiments of the invention will now be described in order to illustrate various features of the invention. The embodiments described herein are not intended to be limiting as to the scope of the invention, but rather are intended to provide examples of the components, use, and operation of the invention.

According to one embodiment, the invention relates to an automated system and method for analysis of structured and unstructured data. The analysis system (sometimes referred to herein as the "System") may include a portfolio of artificial intelligence capabilities, including artificial intelligence domain expertise and related technology components. The System may include foundational capabilities such as document ingestion and optical character recognition (OCR), e.g., the ability to take documents and convert them into formats readable by a machine to perform analytics. According to a preferred embodiment, the System also includes machine learning components that provide the ability for the System to learn without being explicitly programmed (supervised and unsupervised); deep learning components that model high-level abstractions in data; and natural language processing (NLP) and generation, e.g., functionality to understand human speech or text and produce text or speech.

The System can also be designed to ingest and process various types of input data, including structured data (e.g., data organized in columns and rows such as transactional system data and Microsoft Excel files); semi-structured data (e.g., text not stored in a recognized data structure but that still contains some type of tabs or formatting, such as forms); unstructured data (e.g., text not stored in a recognized data structure, such as contracts, Tweets and policy documents); and images and voice (e.g., photographs or other visual depictions of physical objects and human voice data).

The System can be deployed to ingest, understand and analyze the documents, communications, and websites that make up the rapidly growing body of structured data and unstructured data. According to one embodiment, the System may be designed to: (a) read transcripts, tax filings, communications, financial reports, and similar documents and input files, (b) extract information and capture the information into structured files, (c) assess the information in the context of policies, rules, regulations, and/or business objectives, and (d) answer questions, produce insights, and identify patterns and anomalies in the information. The System can capture and store subject matter expertise; ingest, mine and classify documents using natural language processing (NLP); incorporate advanced machine learning and artificial intelligence methods; and utilize collaborative, iterative refinement with advisory and client stakeholders.

Examples of questions that the System can answer may include, for example, which documents comply with a certain policy or regulation, which assets are most risky, which claims warrant intervention, which customers are most/least likely to undergo attrition, which clients will have growing/shrinking wallet and market share, and which documents are experiencing a change in trend or meaning. Examples of policies or rules that the System can analyze may include, for example, new regulations, accounting standards, profitability targets, identification of accretive vs. dilutive projects, assessment of credit risk, asset selection, rebalancing a portfolio, or settlement outcomes, to name a few. Examples of documents that the System can analyze may include, for example, legal contracts, loan documents, securities prospectus, company financial filings, derivatives confirms and masters, insurance policies, insurance claims notes, customer service transcripts, and email exchanges.

FIG. 1 is a functional block diagram of a system for automated analysis of structured and unstructured data according to an exemplary embodiment of the invention. As shown in FIG. 1, the System integrates a variety of data sources, domain knowledge, and human interaction, in addition to the algorithms that ingest and structure the content. The System includes a scanning component 10 to ingest a plurality of documents 5 such as contracts, loan documents, and/or text files, and to extract related data 6. During the ingestion process, the System may incorporate OCR technology to convert an image (e.g., PDF image) into searchable characters and may incorporate NLP pre-processing to convert the scanned images into raw documents 11 and essential content 12. In addition, the appropriate ingestion approach will be used to convert and preserve document metadata and formatting information. In many instances, the input unstructured data will reside in a multitude of documents which together form a corpus 15 of documents that is stored in a dataset.

The FIG. 1 example depicts a "Regulatory Rule Set" that has been implemented in a particular business context. One example of a regulatory rule set may be new or amended financial regulations, and a financial institution or company may need to ensure that its contracts comply with the new regulations. Manual review of the contracts to assess compliance with new regulations is one alternative, but that approach could well involve a very substantial time commitment and extensive costs for experts to review the contracts. Alternatively, the System can be configured to read the contracts, extract information and capture the information into structured files, assess the information in the context of the amended regulations and/or business objectives, and answer questions, produce insights, and identify patterns and anomalies in the contracts. Exemplary embodiments of the invention can thus automate the analysis of complex documents which can provide the benefits of enabling 100% coverage rather than traditional sampling approaches, reducing costs and development time needed to produce insights, enabling humans to achieve and manage precise consistency, leveraging the knowledge and expertise of subject matter experts (SMEs), and automatically creating audit logs describing how the data has been processed.

Referring to FIG. 1, the regulatory rule set is used by subject matter experts in the manual review and are also translated into related semantics 21 and a determination strategy 22 in the machine review. Semantics 21 include domain knowledge embodied in an ontology or knowledge base consisting of entities, relationships and facts. The determination strategy 22 consists of business rules applied to the related semantics 21 to answer specific questions. This includes document-level assessments (such as compliant vs non-compliant), feature-level extraction (termination dates, key entities), inferred facts (such as utilizing extracted facts and the ontology to make inferences), or to identify risk (such as identify portions of the document that require further scrutiny). The machine learning review 25a analyzes dispositive features 26a, such as the specified contract terms, dates, entities, and facts, and undertakes an automated document analysis assessment 27a through the use of an intelligent domain engine (sometimes referred to herein as the "IDE"). The machine learning review 25a assists the machine compliance determination 28a by providing confidence scoring. In parallel, the manual review 25b of selected documents, conducted for example by a subject matter expert, analyzes dispositive features 26b and undertakes a document analysis assessment 27b and a manual compliance determination 28b for a sample of the contracts. The parallel manual and machine assessments are used to determine accuracy and confidence scoring 29, which is then used as feedback 30 for the manual review and the machine review. The feedback 30 allows for the refinement of the machine review, such that each iteration can provide enhanced accuracy in the automated analysis and a corresponding increase in confidence scoring. Active learning methods are used to decrease the number of iterations needed to achieve a given accuracy.

Figure 2:
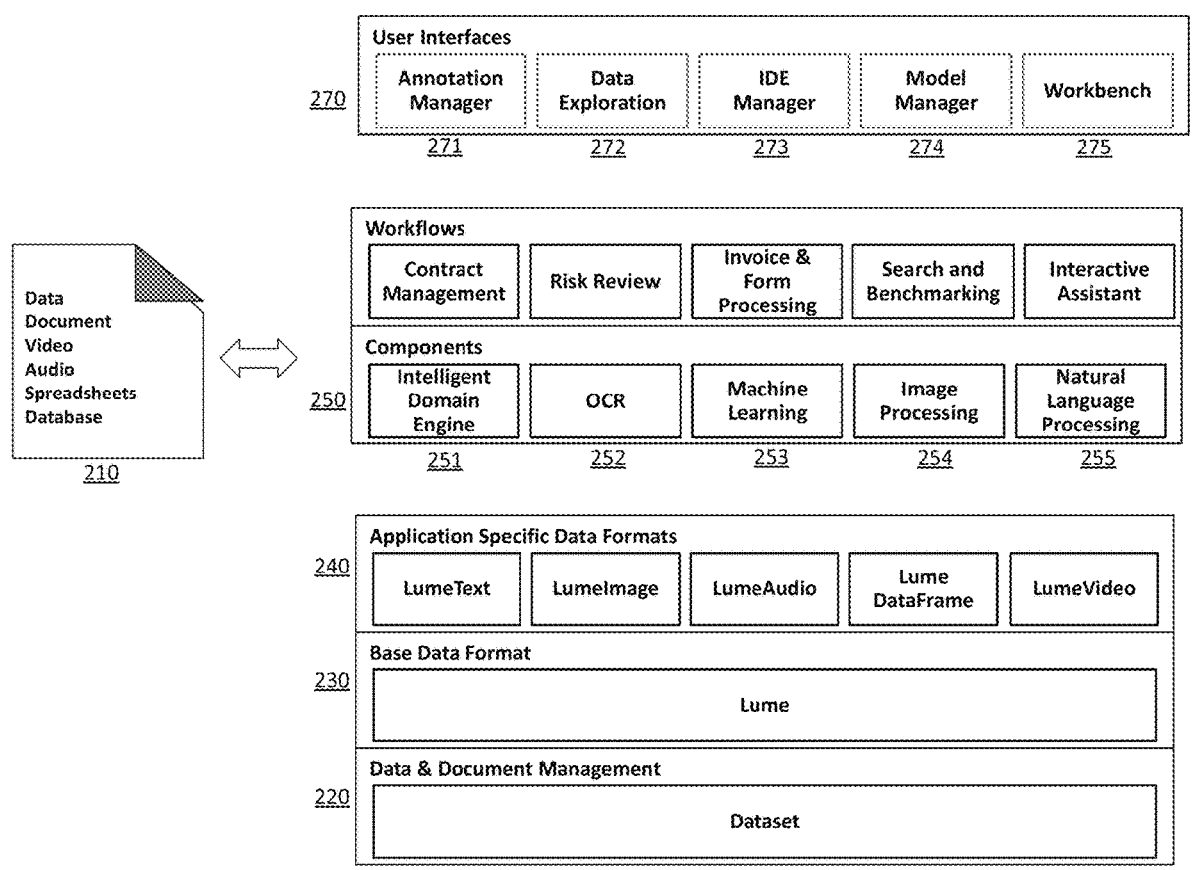
FIG. 2 is a diagram of the architecture of an analysis system according to an exemplary embodiment of the invention.

Referring to FIG. 2, the architecture of the System is depicted according to an exemplary embodiment of the invention. As mentioned previously, the System can support information extraction and data analysis on structured and unstructured data. The input data 210 may take the form of various files or information of different types and formats such as documents, text, video, audio, tables, and databases. As shown in FIG. 2, the data to be analyzed can be input to a core document management system 220.

According to a preferred embodiment of the invention, the input data 210 is transformed into a common data format 230, referred to in FIG. 2 as "Lume." Lume may preferably be the common format for all components and data storage. As shown in FIG. 2, the core document management system includes a document conversion system 240 (to convert documents to a Lume format 230) and a document and corpus repository 220. The document conversion system provides a utility for extracting document data and metadata and storing it in a format 240 used to perform natural language processing. The standardized Lume format 230 facilitates the processing and analysis of data in the Lumes because a multitude of components can then be easily applied to the Lumes and utilize upstream information for enhanced processing. In one application, a workflow of processing can be chained together to identify sentences, tokens, and other document structure; entity identification; annotation against a taxonomy or ontology; and the intelligent domain engine 251 can utilize this information to create derived and inferred features. Each of these components utilizes a Lume 240 as input, and Lume 240 as output, and the metadata can be inserted additively into the Lume. Other examples of components may include, for example, different engines, natural language processing (NLP) components 255, indexing components, and other types of components (e.g., optical character recognition (OCR) 252, machine learning 253, and image processing 254).

Components 250 read Lumes 240 and generate Lume Elements. The Lume Elements are then stored in stand-off annotation format (which is depicted by the database 220, the parent class definition in the base data format 230, and the specific instances of the formats in the application specific data formats 240). As an example, the NLP component 255 processes a Lume 240 and adds additional Lume Elements to indicate human language specific constructs in the underlying data, including word tokens, part-of-speech, semantic role labels, named entities, co-referent phrases, etc. These elements can be indexed to provide users with the ability to quickly search for a set (or individual) Lume 240 or Lume Elements through a query language.

The Lume technology will be described further below with reference to FIGS. 3-6.

FIG. 2 also illustrates that a number of machine learning (ML) components 253 can be incorporated into the System. For example, the System may include an ML conversion component, a classification component, a clustering component, and a deep learning component. The ML conversion component converts the underlying Lume representations into machine-readable vectors for fast analytic processing. The classification component maps a given set of input into a learned set of outputs (categorical or numeric) based on initial training and configuration. The clustering component produces groups of vectors based on a pre-determined similarity metric. The deep learning component is a specific type of machine learning component 253 that utilizes a many-layer network representation of nodes and connections to learn outputs (categorical or numeric).

FIG. 2 illustrates that the System may include a number of user interfaces 270 that enable different types of users to interact with the System. The IDE manager 273 allows users to modify, delete and add expressions to the System. The model manager 274 allows users to select machine learned models for execution in a pipeline. A search interface 272 (i.e., data exploration) allows users to find data loaded in the platform. The document & corpus annotator 271 (i.e., annotation manager) and editors allows users to manually create and modify annotations on a Lume and group Lumes into corpora for training and testing the System. Visual workflow interfaces 275 (i.e., workbench) provide a visual capability for building workflows, and can be used to create histograms and other statistical views of the data stored in the platform.

FIG. 3 illustrates properties and features of a Lume according to an exemplary embodiment of the invention. As shown in FIG. 3, the "name" is a string comprising a non-qualified name of the document. The "data" is a string or binary representation of the document (e.g., serialized data representing the original data). The "elements" are an array of Lume Elements.

As shown in FIG. 3, each Lume Element includes an element ID and an element type. According to a preferred embodiment of the invention, only an element ID and element type are required to define and create a Lume Element. The element ID is a string comprising a unique identifier for the element. The element type is a string that identifies the type of Lume Element. Examples of types of Lume Elements include a part-of-speech (POS) such as noun, verb, adjective; and a named-entity-recognition (NER) such as a person, place or organization. Additionally, file path and file type information can be stored as elements. The file path is a string comprising the full source file path of the document. The file type is a string comprising the file type of the original document.

Although not required, a Lume Element may also include one or more attributes. An attribute is an object comprised of key-value pairs. An example of a key-value pairs might be, for example, {"name":"Wilbur", "age":27}. This creates a simple, yet powerful format that allows the developer flexibility. The reason only the element ID and type are required, according to an exemplary embodiment of the invention, is that it provides flexibility to the developers to store information about a Lume in an element while also ensuring that it's accessible by ID or type. This flexibility allows users to determine how they would like to store relationships and hierarchies among elements according to their domain expertise. For example, elements can contain the necessary information for complicated linguistic structures, store relationships between elements, or refer to other elements.

According to an exemplary embodiment of the invention, the Lume Elements are used to store stand-off annotation format. That is, the elements are stored as annotations separately from the document text, rather than being embedded in the text. According to this embodiment, the System does not modify and can restore the original data.

According to a preferred embodiment, the Lume Elements are not stored in a hierarchical relationship to other Lume Elements, and document data and metadata are stored in a non-hierarchical fashion. Most known formats (other than Lume) are hierarchical, making them difficult to manipulate and convert. Lume's non-hierarchical format allows for easy access to any elements of the document data or its metadata, either at the document level or the text level. In addition, editing, adding, or parsing the data structure can be done via the operations on the elements without the need to resolve conflicts, manage the hierarchy or other operations that may or may not be required for the application. According to this embodiment, because it is a stand-off annotation format, the System can preserve an exact copy of the original data and support overlapping annotations. In addition, this allows for the annotation of multiple formats, such as audio, image and video.

The Lume technology can provide a universal format for document data and metadata. Once the Lume has been created, it can be used in each tool of a natural language processing pipeline without the need for writing format conversions to incorporate tools into the pipeline. This is because the basic conventions required to pass the data and metadata are established by the Lume format. The System provides utilities for extracting document data and metadata from a number of formats, including plain text and Microsoft Word. Format-specific parsers convert the data and metadata from these formats into Lume, and correspondingly write the modified Lume back to the format. The System can use the Lume technology to store information related to families of words to prepare them for natural language processing, such as preprocessing and stemming. In addition, the System can use the Lume technology to store information related to relationships, and graph structures in the document.

According to an exemplary embodiment of the invention, the System includes other components in addition to the Lume and Lume Elements. In particular, the System may be configured to include a dataset, a Lume Data Frame, an Ignite component, and an element index. A dataset is a collection of Lume objects that have a unique identifier. A dataset is typically used to designate training and testing sets for machine learning and can also be used for performing bulk operations on many documents. A Lume Data Frame is a specialized matrix representation of a Lume. Many machine learning and numerical operation components within the System can leverage this optimized format. The System may also include Ignite components that read Lume (or Lume Corpus) data and return Lume (or Lume Corpus) data, usually by processing existing Lume Elements or the original source data and adding new Lume Element objects. An element index is computer object representation of sets or elements and representations typically leveraged in Ignite for efficiency in Lume data and metadata retrieval. For example, some components may be optimized to work over character offsets and therefore an index on character offsets can speed up operations on those components.

According to an exemplary embodiment of the invention, the primary functionalities of the System include data representation, data modeling, discovery and composition, and service interoperability, described as follows.

Data Representation: Lume is the common data format used for storing and communicating analyses on the System. Lume takes a stand-off approach to data representation, e.g., results of analytics are stored as annotations independently of original data. According to one embodiment, Lume is implemented in Python and has computer-object representations as Python objects and is serialized as JavaScript Object Notation ("JSON") for inter-process communication. Lume may be designed for use with web-based specifications, such as JSON, Swagger (YAML), RESTful and will interface with the Python ecosystem, but it can also be implemented in, and support components written in Java and other languages.

Data Modeling: Lume can be designed to be simple and only enforce basic requirements on users of the System. Interpretations and business logic are left to the users of the System rather than requiring declarative representations of both data and processes. The System can be designed to leave the modeling informal and to leave the details for implementations in the processing components. This allows Lume to maintain a very simple specification, and allows it to be extended for specific applications without impeding other applications. For example, when searching the Lume is important, it is integrated with modules that index on top of the Lume structure. When working with a document object model (DOM) is important, the DOM parser stores the addition information in the form of Lume Elements and attributes into the Lume, and converts back out to a DOM model with this information.

Discovery and Composition: Lume may also have an additional design feature relating to analytic process provenance. The System workflows can require provenance information to promote repeatability and discovery of components. This provenance information is stored in Lume and can be enforced though provenance-enforcing workflows. For example, this can provide a check on each of the output Lumes to ensure that the correct processing steps were completed. In the validation stage, it can provide a means to track the provenance of the Lume Element that created the correct or incorrect metadata. Further, it can also track to ensure that all inputs are received as outputs.

Service Interoperability. The services provided by the System may require Swagger (YAML markup language) specifications, according to one embodiment of the invention. There may be many assumptions regarding business logic, order of operations and other data interpretations that are utilized to implement a System component. Identifying which components are interoperable may be achieved through the analysis of example workflows, rather than input and output specifications. In the System, a component may simply operate on a Lume and in the case of error return correct error codes and write the appropriate logging information.

Figure 4A:
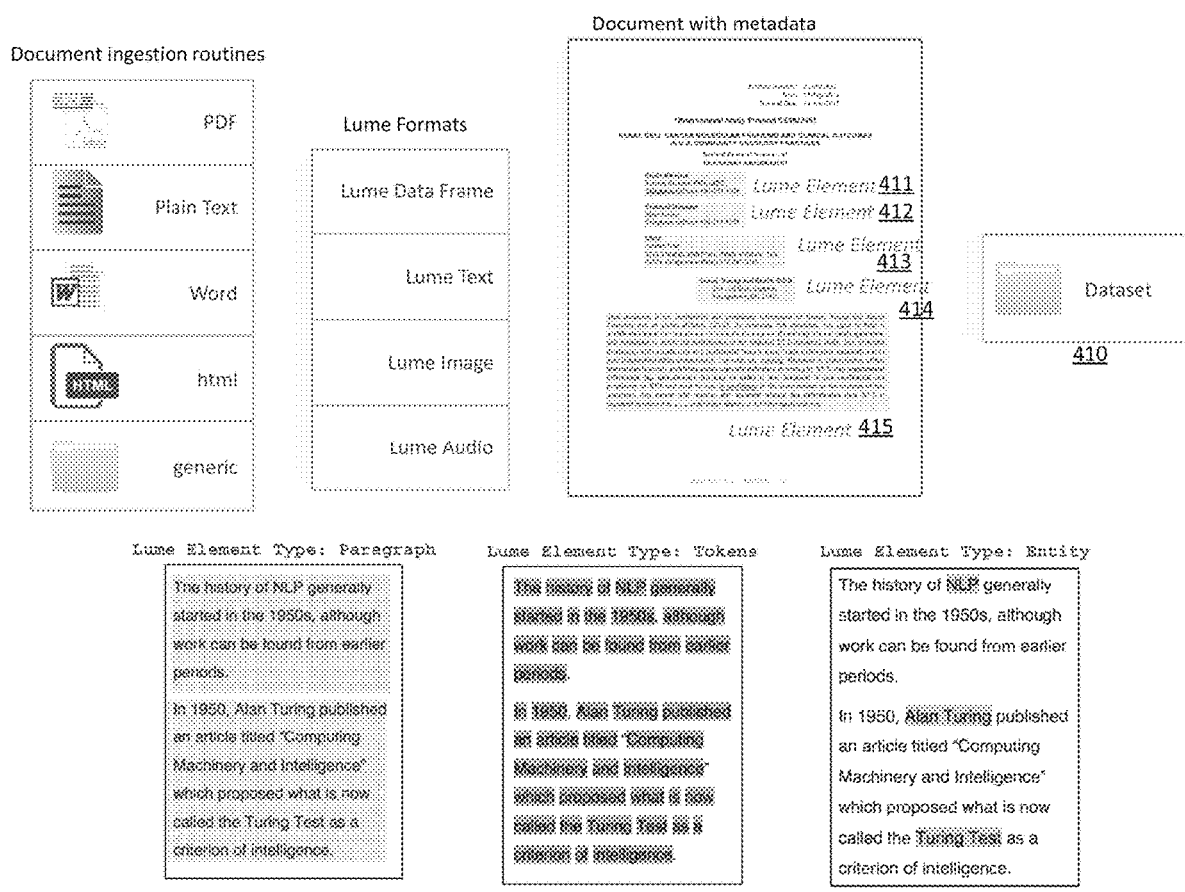
FIG. 4A is a drawing depicting an example of a Lume structure and example levels according to an exemplary embodiment of the invention.

FIG. 4A illustrates an example of the Lume structure and the initial conversion of different types of files into Lumes. As shown in FIG. 4A, dataset 410 refers to a body of different types of files or documents. These documents may initially be in different formats, e.g., such as Adobe portable document format (PDF), unstructured text files, Microsoft Word files, and HTML files.

FIG. 4A also illustrates an example of defined elements for the Lume. For example, a first element 411 may correspond to the study director including contact information; a second element may correspond to the protocol manager including contact information 412; a third element may correspond to the contract research organization (CRO) including contact information 413, a fourth element may correspond to a research & development company 414, and a fifth element 415 may correspond to a confidentiality notice for the document. FIG. 4B illustrates a larger view of the document with metadata depicted in FIG. 4A.

Also shown in FIG. 4A are example levels of element types. For example, the System may provide functionality to enable the user to identify individual paragraphs, tokens or entities, each of which can be extracted from the Lume.

FIG. 5 provides further detail of an example of a Lume creation from a Microsoft Word document. As shown in FIG. 5, the first step, i.e., step 501, is to initialize the original document. Initialization entails storing the original data in the Lume object. The second step, i.e., step 502, is to parse the document into elements in the Lume format. The step may include a loop 502a in which elements are created corresponding to metadata from the source document. This is performed by document specific components that ingest the specific format. In particular, during ingestion, (i) the original file is opened, (ii) the DOCX format is decompressed into an XML file, and then (iii) the XML file is read into a data structure for parsing. The parsing separates the data in the document from the metadata, and then stores the data in the "data" field of the Lume, and the metadata into Lume Elements. This will then be output as a LumeText. Examples of metadata stored are author, page, paragraph, and font information.

At the conclusion of the process shown in FIG. 5, the input document has been converted into Lume, and the desired elements have been generated and stored.

Figure 6:
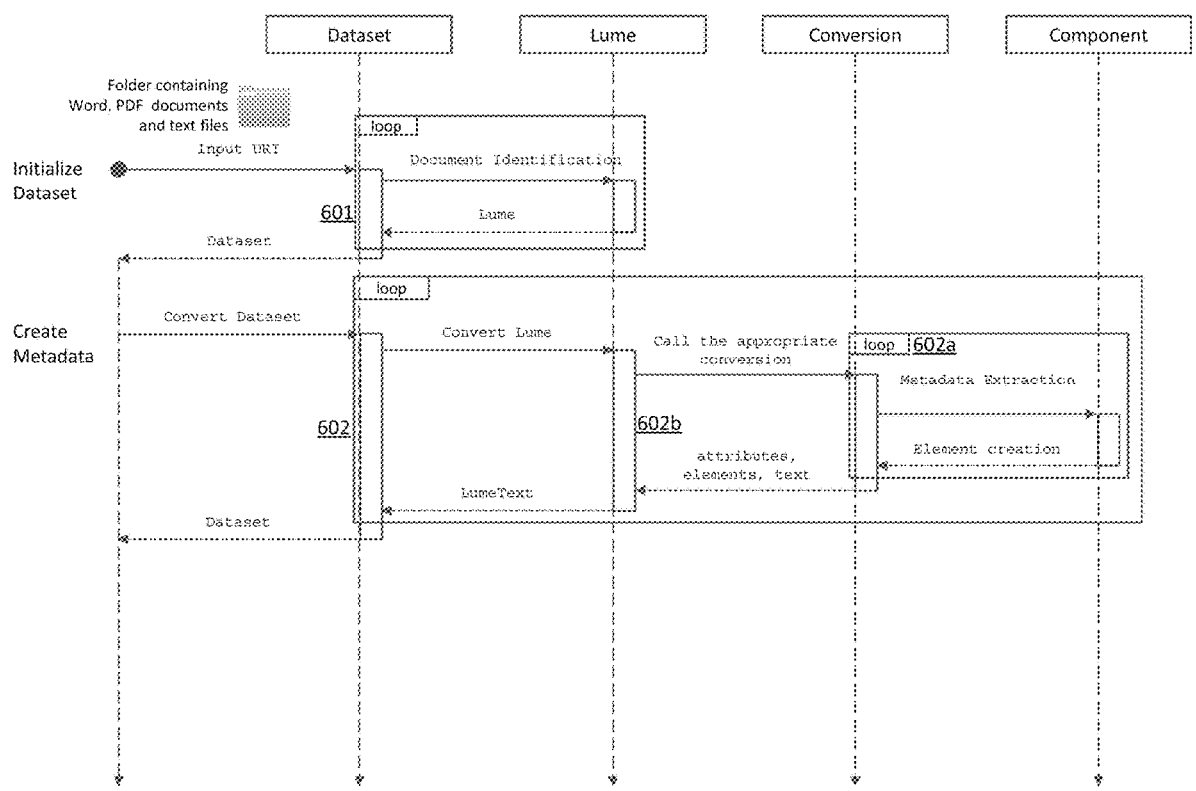
FIG. 6 is a drawing depicting a dataset creation process from a directory of Microsoft Word and text files according to an exemplary embodiment of the invention.

FIG. 6 illustrates an example of applying the functionality of FIG. 5 to a corpus of documents. The first step in FIG. 6, i.e., step 601, comprises initializing the dataset. The subsequent steps in FIG. 6 entail application of the processes shown in FIG. 5 to each document in the dataset. As the Lumes in the dataset are converted to Lume format in step 602, the results are stored in the dataset. The conversion includes the creation of the Lume data structure (i.e., loop 602b), the conversion of the format-specific metadata into Lume Elements (i.e., step 602a), and additional annotations that are needed, such as semantic annotation, natural language processing, creating domain-specific features, or a vectorization to a quantitative fingerprint. More specifically, in step 601, the dataset documents are identified in the URI, and then the Lumes containing the file data is passed to 602. Next, in 602b, the Lume is passed to the appropriate parser, which creates the appropriate data structure for parsing. In 602a, the parsing work through the document, parsing the data in the "data" field of the Lume, and the metadata into Lume Elements. This will then be output as a LumeText.

Figure 7:
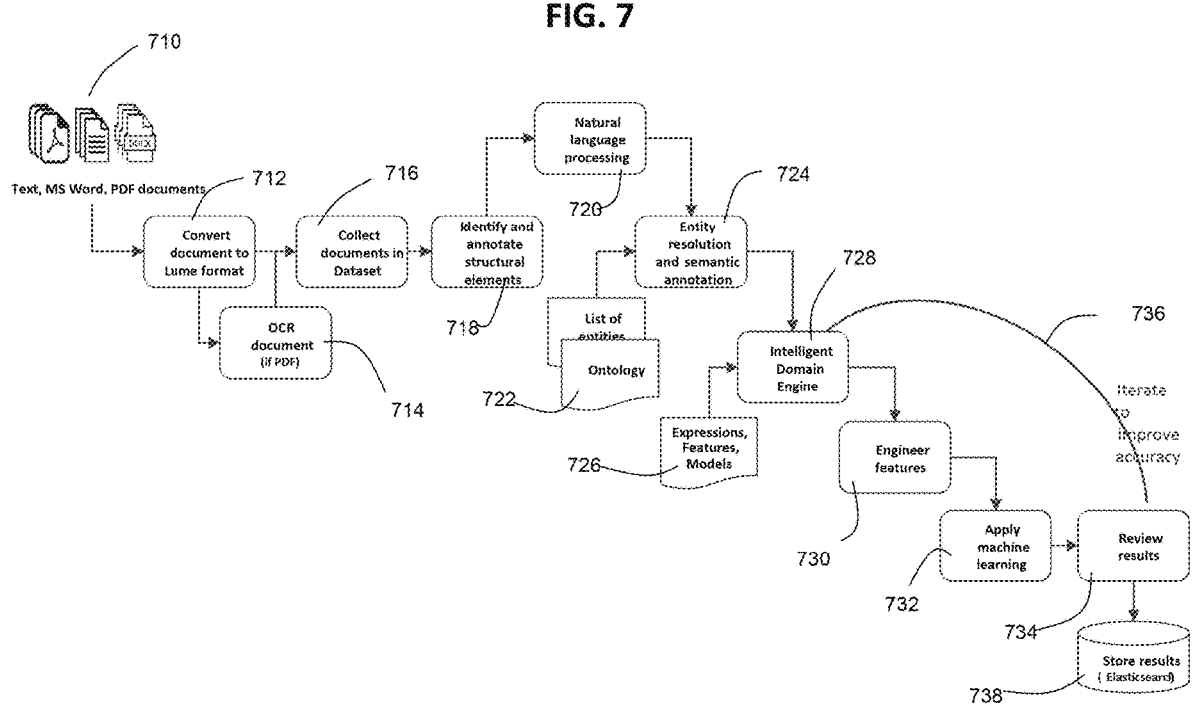
FIG. 7 is a flow diagram for the analysis system according to an exemplary embodiment of the invention.

FIG. 7 is a process diagram that illustrates an example of a process for analyzing structured and unstructured data according to an exemplary embodiment of the invention. In step 710, documents such as text, Microsoft Word, and/or Adobe PDF documents are ingested into the System. The documents are then converted in step 712 to Lume format as described above. An OCR process may be used in step 714 to convert an image file to characters. In step 716, the documents are collected in a Dataset. In step 718, the System identifies and annotates structural Lume Elements (e.g., see FIG. 6). Once the documents have been converted into Lume format and the Lume Elements have been generated, natural language processing (NLP) routines or components can be applied in step 720 to the Lume formatted information.

In step 722, a user of the System creates and inputs an ontology comprising a list of entities. According to one example, an ontology may describe the people and for which businesses they have been employees. The ontology can be useful for extracting people and businesses from documents in the platform, for example. Alternatively, the ontology can describe the different products of a company, the categories that they belong to, and any dependencies between them. Step 724 involves entity resolution and semantic annotation. Entity resolution determines which entities referred to in the data are actually the same real-world entities. This resolution is accomplished through the use of extracted data, ontologies and additional machine learning models. Semantic annotation relates phrases in the data to the formally-defined concepts defined on the ontologies. In the business employee example above, appearances of words "John Doe" will be identified, and connected with the employee John Doe in the ontology. This will enable downstream components to utilize additional information about John Doe, for example his title and function in the company.

In Step 726, a user of the System creates expressions that are to be applied to the documents stored in the dataset. The expressions may be, for example, comma-separated-value (CSV) files that specify patterns to search for or other distinguishing features of documents. The expressions may incorporate the expertise and know-how of subject matter experts. For example, an expression may identify various specific words and relationships between words, or patterns, that identify particular contract clauses or clauses in a tax document. These expressions are used to search for and identify particular aspects, clauses, or other identifying features of a document. The expression may also leverage a machine learning operator, pre-trained sequence labeling component, or an algorithmic parser that acts as one of the operators into the IDE.

In step 728, the expressions are input into an IDE, which reads the expressions and applies them to the dataset. According to one embodiment, the output may comprise predicted answers and support and justification for the answers. The IDE will be described further below in connection with FIGS. 8-12.

In step 730, the output of the IDE can be utilized to engineer additional features. This utilizes the previously created Lume Elements, and creates new Lume Elements corresponding to the additional features. The feature engineering can be thought abstractly as indicator functions over sets of Lume Elements to create features related to specific signals, for learning and inference tasks. In the general case, the feature engineering can generate additional categorical, or descriptive text features needed for sequence labelling, or sequence learning tasks. For example, the engineering can prepare features for custom entity tagging, identify relationships, or target a subset of elements for downstream learning.

In step 732, machine learning algorithms or routines are applied to generate results from the Lume Elements created upstream. The machine learning can also be replaced by sequence labelling, or Bayesian network analysis. This creates machine-learned scoring, or probabilistic information on the accuracy of prior annotations, the relationships between elements, or in conjunction with new annotations or classification metadata. The results are analyzed in step 734, where the results are provided to an analyst for review, either through a UI to inspect the annotations or a workbench to perform further analysis on the results. In step 736, one or more iterations are performed to improve predictive accuracy. The steps of applying the expressions 728, engineering features 730, applying machine learning 732, and reviewing results 734 may be repeated to improve accuracy. Once the accuracy has been improved to achieve a desired level, the results may be stored in a database in step 738. Note that entity resolution and semantic resolution 724, engineer features 730 and machine learning 734 will also be utilized within the Intelligent Domain Engine, but is separated in the case of large-scale processing pipelines.

According to an exemplary embodiment of the invention, the IDE comprises a platform for leveraging natural language processing, custom built annotation components, and manually encoded expressions to systematically classify and analyze a corpus of documents. The IDE can provide a platform for combining a company's cognitive/AI abilities with industry domain knowledge. Each document classification can be represented by a set of expressions that may include the features to be utilized, the patterns of the features to be identified, and reference location or scope information to focus the classification task. Expressions can be composed and work with Lume Elements and data contained in the Lume. The IDE can be designed to systematically evaluate expressions for each document in the corpus, producing specified results as well as annotated text supporting the classification determinations. Note that in this example, the IDE is utilized for natural language processing and text mining, however, the IDE framework applies to all Lume formats, such as images, audio, and video.

The IDE can provide a number of advantages. For example, the IDE can output annotated text to support classification decisions, in addition to an answer to a specific question. Annotations can be used to audit results and provide transparency. In addition, training an accurate machine learning model generally requires a large number of labeled documents. Using the IDE to integrate the domain knowledge with machine learning can reduce the number of documents needed to train an accurate model by an order of magnitude, by utilizing expert-derived features. This is because the machine learning problems involving unstructured data are generally overdetermined, and the ability to select accurate, and interpretable features requires more data than is generally available. For example, in documents, many tens of thousands of features can exist, including the dictionary of words, orthographic features, document structures, syntactic features, and semantic features. Furthermore, according to an exemplary embodiment of the invention, individuals such as subject matter experts (SMEs) who input expressions do not need computer coding skills, as expressions can be created using a domain specific language that can be codified in no-code environments, such as in spreadsheets (CSV or XLSX) or through an IDE user interface. Thereby the SME can create domain relevant features that can be leveraged for the machine training process. The IDE UI allows users to modify, delete and add expressions to the System and visualize elements created by executing the IDE. In addition, expressions can be designed to be interchangeable. They can be created for reuse in use cases throughout an industry or problem set. Additionally, the IDE can be designed to leverage the Lume format for storing and working with documents. This design allows the annotations and metadata to be inputs for the expressions, in addition to the textual features that exist in the document.

According to an exemplary embodiment of the invention, the process for creating and using an expression involves: (1) reviewing documents manually, (2) capturing patterns through expressions and creating custom built code that may leverage machine learning or statistical extraction, (3) loading expressions into the IDE and running the IDE, (4) building confusion matrices and accuracy statistics (i.e., by comparing the current results on an unseen set of documents, this creates an estimate of how well the expressions will generalize, and determines whether the System meets the performance requirements), (5) iterating and refining the foregoing steps, and (6) producing output, such as predicted answers and sections providing support and justification for answers.

According to one particular example, the IDE may be used to automatically determine answers to legal questions by analyzing documents such as investment management agreements or other legal documents. For the purpose of illustration, in this particular example suppose a company has 8 legal questions to answer in connection with 500 investment management agreements. An example question might be "Does the contract require notification in connection with identified personnel changes?" FIG. 8 depicts an example of sections of an investment management contract relevant to the legal question.

FIG. 9 illustrates examples of expressions according to one embodiment of the invention. As shown in FIG. 9, the expressions may be detailed in a table format (such as CSV), rather than in code. In the FIG. 9 example, each expression has a "name," which may be useful when referencing other expressions. The name may also be used by the output file to create features. Each expression may also contain a "scope," which focuses and limits expressions to be applied. The scope itself is evaluated as an expression, and its results are used to limit the scope of the parent expression. For example, a scope expression may refer to Lume Elements (where it is pre-specified in the conversion to the Lume format or is created by another expression), or can be the result of an operator that identifies the appropriate clause in a contract. The expression also includes a "string" field which is where the expression is contained. The string field has a predetermined syntax. The string field can specify patterns to look for in the documents or logical operations. FIG. 9 shows examples of the string field.

The expression may also include a "condition" field, which is used to determine whether the particular expression should be evaluated or not. This is useful in enabling or disabling expressions for computational efficiency, or to implement control logic to enable or disable certain types of processing.

An expression may be used to search for patterns in documents, and the expression may encapsulate those patterns. Examples of such patterns include, for example, different ways to express a notification requirement and personnel changes. For example, there are many words for "personnel" such as "key person," "investment team," "professional staff," "senior staff," "senior officers," "portfolio manager," "portfolio managers," "investment managers," "key decision makers," "key employees," and "investment manager." Case sensitivity will matter in some cases. For example, "investment manager" may refer to an employee; whereas "investment manager" may refer to the client's investment organization. The order of words (indicating a subject-object relationship) will matter in some cases. For example, an investment manager notifying the client is not the same as the client notifying the investment manager. All of these types of patterns can be encapsulated in the expressions. Subject matter experts (SMEs) can encapsulate in the expressions their know-how in analyzing certain types of specialized document types.

FIG. 10 illustrates an example of one form of output from the IDE: predicted answers. It includes answers to each question for each document. For example, as shown in FIG. 10, the output may comprise a table listing the filename of the input file, an answer to four questions that provide determinations on features of the contract. According to an embodiment, there may be many more questions or features that will be output from the IDE.

FIG. 11 illustrates an example of another form of out from the IDE: support and justification for the answers. In FIG. 11, the user interface displays the actual contract language used by the IDE to support and justify its given answer. The actual contract language is presented so that a user can evaluate whether the IDE is correct. The System can utilize information stored in the Lume Element to highlight certain words in the text that specifically form the basis for the answer provided by the IDE. In this way, the IDE enables a human user to easily verify whether the answer is correct. It also facilitates the user's ability to understand any errors and to refine the expression to correct such errors.

Figure 12:
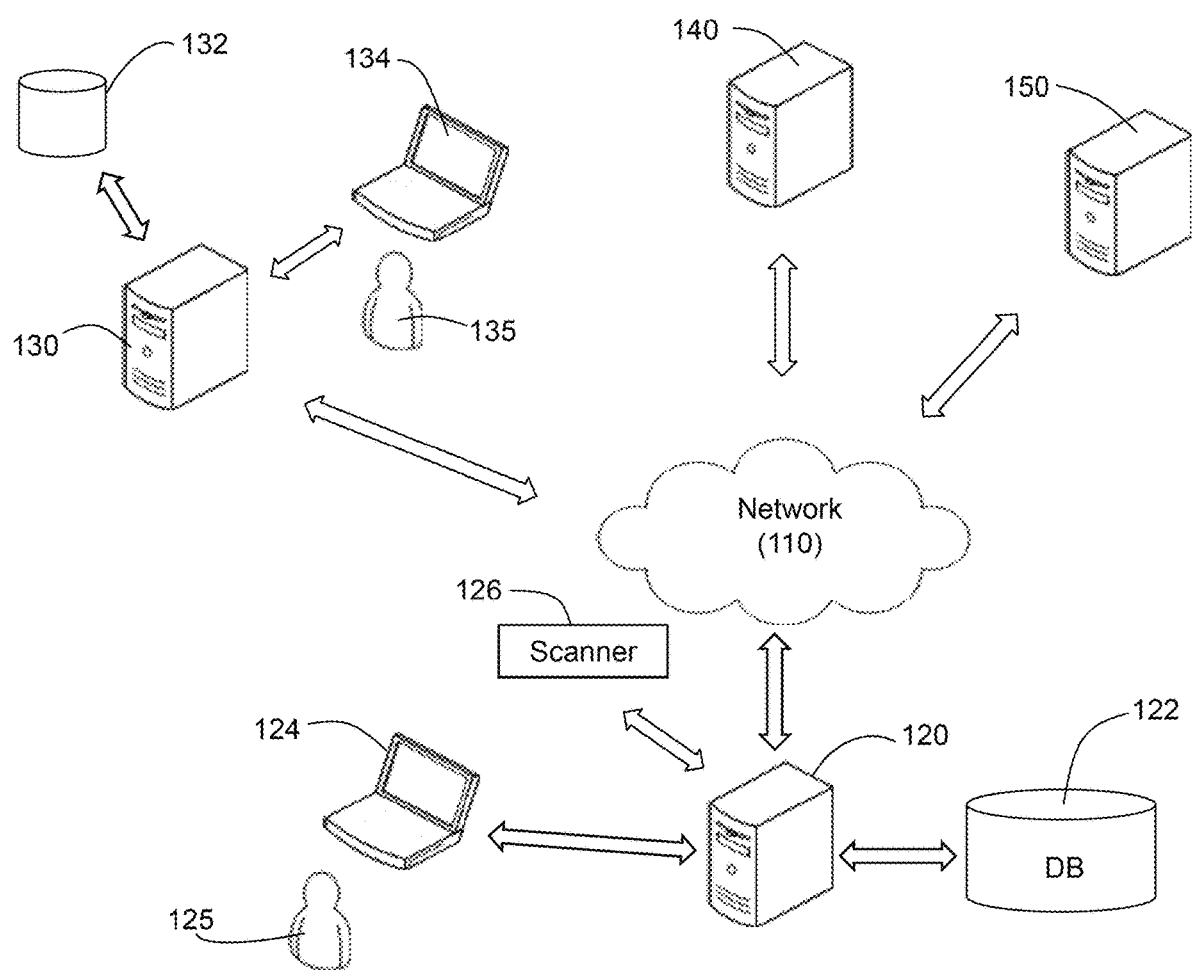
FIG. 12 is a system diagram of the analysis system according to an exemplary embodiment of the invention.

FIG. 12 is a system diagram of the System according to an exemplary embodiment of the invention. As shown in FIG. 12, the System may comprise a server 120 and associated database 122 along with the software and data that are used to run the System. The System may also include a scanner 126 used to scan and ingest original documents into the System. The server 120 and database 122 may be used to store the ingested documents, as well as to store the IDE, the Lumes and Lume Elements, and the other software and data used by the System. A user 125 such as a subject matter expert (e.g., tax professional) can access and use the server 120, scanner 126, and database 122 through a personal computing device 124, such as a laptop computer, desktop computer, or tablet computer, for example.

The System may also be configured to allow one or more clients or other users to access the System. For example, as shown in FIG. 12, a client 135 may use a personal computing device 134 and company server 130 to access the server 120 via network 110. The client may also transmit client-specific data (e.g., a set of contracts to be analyzed) stored in a client database 132 to the System to be incorporated into the Dataset documents to be analyzed by the server 120 and stored in the database 122. The server 120 shown in FIG. 12 can receive other documents, spreadsheets, pdf files, text files, audio files, video files, and other structured and unstructured data from other clients or users, represented generally by servers 140 and 150.

Also shown in FIG. 12 is a network 110. The network 110 may comprise any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example. The other computing devices, such as servers, desktop computers, laptop computers, and mobile computers, may be operated by different individuals or groups, for example, and may transmit data such as contracts or insurance policies to the server 120 and database 122 via the network 110. In addition, cloud-based architectures, with containerized or microservices-based architectures may also be used to deploy the System.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The foregoing descriptions provide examples of different configurations and features of embodiments of the invention. While certain nomenclature and types of applications/hardware are described, other names and application/hardware usage is possible and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the System software may be implemented as one or more computer program products, for example, one or more modules of computer program instructions encoded on a computer-readable medium for execution by, or to control the operation of, data processing apparatus. The implementations can include single or distributed processing of algorithms. The computer-readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer-readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the embodiments have been particularly shown and described within the framework for conducting analysis, it will be appreciated that variations and modifications may be affected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages of the will be apparent to those skilled in the art from consideration of the specification and practice of the embodiments disclosed herein. The specification and examples should be considered exemplary.

What is claimed is:

1. A computer-implemented method for analyzing at least one of structured and unstructured data, the method comprising:
    receiving at least one specific question and at least one input file to be analyzed, wherein the at least one input file comprises at least one of: text, an image, an audio file, a video file, a table, and a database; and
    applying an artificial intelligence process to the at least one input file, the artificial intelligence process comprising the steps of:
        generating, for the at least one input file, a converted file in a data format that is standardized for a plurality of input file types and that includes at least one element;
        generating the at least one element, wherein the at least one element includes an element identifier and an element type, and is stored in a non-hierarchical relationship format to other elements;
        generating at least one expression, wherein the expression comprises an expression string that is in a domain-specific language;
        reading, via a machine review portion of the artificial intelligence process, the at least one expression;
        applying, via the machine review portion of the artificial intelligence process, the at least one expression to the converted file to generate an output file having an answer to the specific question; and
        applying the answer to the specific question as feedback to the artificial intelligence process to improve the accuracy of the artificial intelligence process.

2. The method of claim 1, wherein the converted file is configured to interface with a dynamic, interpreted language.

3. The method of claim 1, wherein the converted file is configured to interface with Python.

4. The method of claim 1, wherein the converted file is (i) implemented in Python and includes computer-object representations as Python objects and (ii) serialized as JSON for inter-process communication.

5. The method of claim 1, wherein the converted file is configured for use with JSON, Swagger (YAML), and RESTful.

6. The method of claim 1, wherein the converted file further includes a name of the document, a file path for the document, a file type of the document, and a binary representation of the document.

7. The method of claim 1, wherein the at least one element further includes at least one attribute, wherein the at least one attribute comprises a key-value pair.

8. The method of claim 1, wherein the expression is configured to interface with the format of the converted file.

9. The method of claim 1, wherein the at least one element is generated and stored in a stand-off annotation format in an annotated file, wherein the at least one expression is applied to the annotated file to generate the output file.

10. The method of claim 9, wherein the expression string (i) specifies at least one of a programmatic logical operation and a pattern to search for in the annotated file and (ii) incorporates subject matter expertise for a particular question.

11. The method of claim 1, wherein the domain-specific language is stored in a comma-separated-value file.

12. A system for analyzing at least one of structured and unstructured data, the system comprising:
    a scanner, wherein the scanner is configured to receive at least one input file to be analyzed, wherein the at least one input file comprises at least one of: text, an image, an audio file, a video file, a table, and a database; and
    a server, wherein the server is configured to:
        receive at least one specific question and the scanned at least one input file;
        apply an artificial intelligence process to the at least one input file;
        generate, for the at least one input file, a converted file in a data format that is standardized for a plurality of input file types and that includes at least one element;
        generate the at least one element, wherein the at least one element includes an element identifier and an element type and is stored in a non-hierarchical relationship format to other elements;
        generate at least one expression, wherein the expression comprises an expression string that is in a domain-specific language;
        read, via a machine review portion of the artificial intelligence process, the at least one expression;
        apply, via the machine review portion of the artificial intelligence process, the at least one expression to the converted file to generate an output file having an answer to the specific question; and
        apply the answer to the specific question as feedback to the artificial intelligence process to improve the accuracy of the artificial intelligence process.

13. The system of claim 12, wherein the server includes an intelligent domain engine (IDE), wherein the IDE is configured to:

receive the at least one expression, apply the at least one expression to the at least one input file, and output the answer to the specific question based on the applying.

14. The system of claim 13, wherein the IDE incorporates at least one of natural language processing, machine learning, annotation components, and manually-encoded expressions to classify and analyze the at least one input file.

15. The system of claim 12, wherein the server is further configured to:

extract original source data and metadata from the at least one input file, store the extracted original source data in the converted file, generate the at least one element based on a conversion of the extracted metadata, store the generated at least one element in the converted file.

16. The system of claim 15, wherein the metadata is at least one of author information, page information, paragraph information, and font information.

17. The system of claim 15, wherein the extracted metadata is converted with a format-specific parser.

18. The system of claim 12, wherein the server is further configured to perform at least one of entity resolution and semantic annotation on the at least one input file.

19. The system of claim 18, wherein (i) the entity resolution determines a match between data associated with the at least one input file and data associated with at least one ontology and (ii) the semantic annotation connects the data associated with the at least one input file with the data associated with at least one ontology.

20. A system for analyzing at least one of structured and unstructured data, the system comprising:

a server, wherein the server is configured to:

receive at least one specific question and at least one input file to be analyzed, wherein the at least one input file comprises at least one of: text, an image, an audio file, a video file, a table, and a database;

apply an artificial intelligence process to the at least one input file;

generate, for the at least one input file, a converted file in a data format that is standardized for a plurality of input file types and that includes at least one element;

generate the at least one element, wherein the at least one element includes an element identifier and an element type and is stored in a non-hierarchical relationship format to other elements;

generate, by a artificial intelligence operator, at least one expression, wherein the expression comprises an expression string that is in a domain-specific language;

read, via a machine review portion of the artificial intelligence process, the at least one expression;

apply, via the machine review portion of the artificial intelligence process, the at least one expression to the converted file to generate an output file having an answer to the specific question; and apply the answer to the specific question as feedback to the artificial intelligence process to improve the accuracy of the artificial intelligence process.

\* \* \* \* \*

UNITED STATES PATENT AND TRADEMARK OFFICE
CERTIFICATE OF CORRECTION

PATENT NO. : 10,846,341 B2
APPLICATION NO. : 16/159088
DATED : November 24, 2020
INVENTOR(S) : Timothy J. Cerino et al.

It is certified that error appears in the above-identified patent and that said Letters Patent is hereby corrected as shown below:

On the Title Page

Please add the following inventor:
Item (72) "Ricardo Manuel Ramos Dos Santos Neves, New York, NY (US)"

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*